United States Patent
Gommershtadt et al.

(10) Patent No.: US 10,621,296 B1
(45) Date of Patent: Apr. 14, 2020

(54) GENERATING SAIF EFFICIENTLY FROM HARDWARE PLATFORMS

(71) Applicant: Synopsys, Inc., Mountain View, CA (US)

(72) Inventors: Boris Gommershtadt, Mevaseret Zion (IL); Alexander John Wakefield, Fort Lauderdale, FL (US); Solaiman Rahim, San Francisco, CA (US); Lakshmi Narayana Koduri Hanumath Prasad, Austin, TX (US)

(73) Assignee: Synopsys, Inc., Mountain View, CA (US)

( * ) Notice: Subject to any disclaimer, the term of this patent is extended or adjusted under 35 U.S.C. 154(b) by 121 days.

(21) Appl. No.: 16/002,505

(22) Filed: Jun. 7, 2018

Related U.S. Application Data

(60) Provisional application No. 62/516,545, filed on Jun. 7, 2017.

(51) Int. Cl.
*G06F 17/50* (2006.01)
*G06F 11/30* (2006.01)
*G06F 11/34* (2006.01)

(52) U.S. Cl.
CPC ........ *G06F 17/505* (2013.01); *G06F 11/3048* (2013.01); *G06F 11/3409* (2013.01); *G06F 17/5022* (2013.01)

(58) Field of Classification Search
CPC .............. G06F 17/505; G06F 17/5022; G06F 11/3048; G06F 11/3409
See application file for complete search history.

(56) References Cited

U.S. PATENT DOCUMENTS

| | | | | | |
|---|---|---|---|---|---|
| 5,949,689 | A | * | 9/1999 | Olson | G06F 17/5022 703/14 |
| 6,181,164 | B1 | * | 1/2001 | Miller | H03K 19/1736 326/40 |

(Continued)

FOREIGN PATENT DOCUMENTS

EP 2006784 A1 12/2008

OTHER PUBLICATIONS

NOVAS Software, Inc. "CIC Training Course: HDL Debugging with Debussy," Jul. 2004, 117 pages, [Online] [Retrieved on Jan. 8, 2019] Retrieved from the Internet <URL:http://read.pudn.com/downloads58/sourcecode/embed/206147/debussy0407.pdf>.

(Continued)

Primary Examiner — Naum Levin
(74) Attorney, Agent, or Firm — Fenwick & West LLP

(57) ABSTRACT

A method for calculating switching interface activity format (SAIF) for a circuit design includes segregating the circuit design into a plurality of hardware look up tables (LUTs), inserting switching interface activity format (SAIF) counter logic, and inserting a multiplexer between the LUTs and the SAIF counter logic. The SAIF counter logic includes shadow logic, at least one counter, and memory. The method further includes (i) selecting a previously-unselected LUT by switching the multiplexer to the selected LUT, (ii) executing a test through the selected LUT and the SAIF counter logic to generate SAIF data for the LUT, (iii) storing the SAIF data for the selected LUT in the memory, and (iv) continuing with (i) through (iii) until each of the plurality of LUTs is selected. The method further involves merging the SAIF data from each selected LUT into a consolidated SAIF file with SAIF data for the circuit design.

16 Claims, 9 Drawing Sheets

(56) References Cited

U.S. PATENT DOCUMENTS

| | | | |
|---|---|---|---|
| 7,260,804 B1 | 8/2007 | Burstein et al. | |
| 7,810,058 B1 * | 10/2010 | Tuan | G06F 17/5036 |
| | | | 716/109 |
| 8,108,194 B2 | 1/2012 | Zhu et al. | |
| 8,286,112 B2 * | 10/2012 | Miranda | G06F 17/5031 |
| | | | 716/110 |
| 8,453,086 B2 * | 5/2013 | Tung | G06F 17/5022 |
| | | | 716/109 |
| 8,739,094 B2 | 5/2014 | Fennell et al. | |
| 2016/0098504 A1 * | 4/2016 | Larzul | G06F 17/5027 |
| | | | 716/136 |
| 2018/0137031 A1 * | 5/2018 | Jain | G06F 11/3656 |

OTHER PUBLICATIONS

Shim, K. et al., "A Fast Two-Pass HDL Simulation with On-Demand Dump," IEEE, 2008, pp. 422-427, [Online] [Retrieved on Jan. 8, 2019] Retrieved from the Internet <https://sci-hub.tw/10.1109/ASPDAC.2008.4483987>.

Xilinx, Inc., "Vivado Design Suite Tutorial: In Depth Simulation", UG937 (v 2012.3) Nov. 16, 2012, 47 pages, [Online] [Retrieved on Jan. 8, 2019] Retrieved from the Internet <URL:https://www.xilinx.com/support/documentation/sw_manuals/xilinx2012_3/ug937-vivado-design-suite-simulation-tutorial.pdf>.

* cited by examiner

Shadow LUT SAIF Process
600

Segregate circuit into multiple lookup tables (LUTs)
610

For each of the LUTs

Select LUT
620

Copy logic from LUT into shadow LUT
630

Execute a test signal on shadow LUT to generate a SAIF file
640

Store SAIF file in memory
650

Recompile until each of the subnets has been selected:

Merge SAIF files from each LUT into a consolidated SAIF file
660

FIG. 6

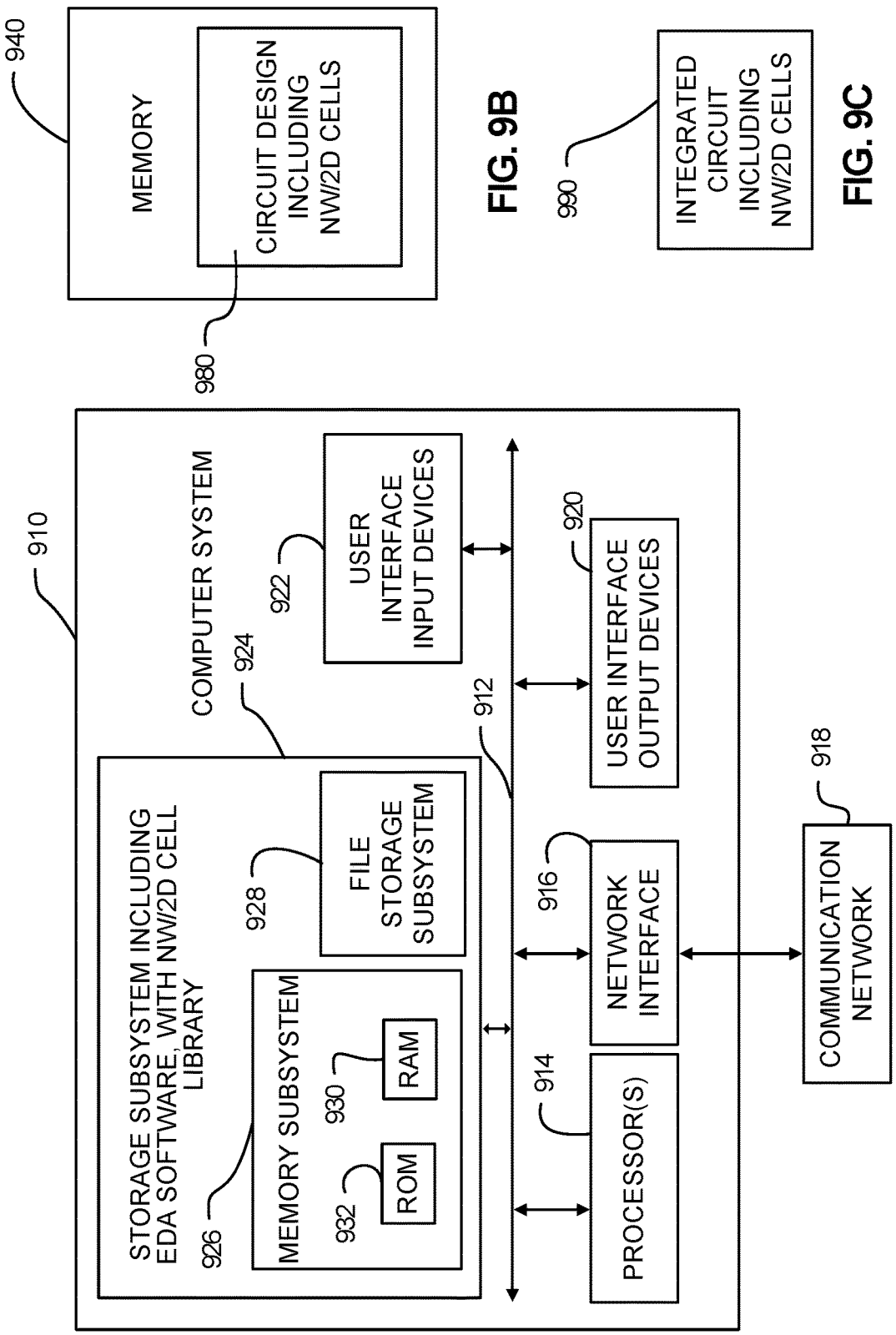

GENERATING SAIF EFFICIENTLY FROM HARDWARE PLATFORMS

CROSS REFERENCE TO RELATED APPLICATIONS

This application claims the benefit of U.S. Provisional Application No. 62/516,545, filed Jun. 7, 2017, which is incorporated by reference in its entirety.

TECHNICAL FIELD

The present disclosure is directed to emulation, and more specifically an efficient method to calculate power consumption for an emulated circuit design.

BACKGROUND

An emulation system executes at a fast speed and generates a huge amount of data for post-emulation analysis such as, debugging, power-estimation, or the like. Briefly, the typical post emulation approach consists of a file-based flow that evolves through two steps. First, a simulator or emulator tracks the switching activity either cumulatively for the entire run in a switching activity interchange format (SAIF) file, or on a cycle-by-cycle basis for each signal in a signal database file such as file system database (FSDB) or value change dump (VCD). Then, a power estimation tool fed by the SAIF file calculates the average power consumption of a whole circuit, or an FSDB file computes the peak power in time and space of the design.

Traditional approaches to generating a Switching Activity Interchange Format (SAIF) data file involve dumping large amounts of data from the emulator, which suffers from one or more of the following limitations: 1) if all sequential and combinational signals are dumped from the emulator, the data transfer from the emulator is time-consuming due to limits on the data bandwidth from the emulator hardware; 2) extracting all sequential and combinational signals requires significant additional hardware resources inside the emulator, causing capacity or speed problems during emulation; or 3) if only sequential elements are dumped and all combinational signals are reconstructed offline using multiple parallel event-based simulators, the reconstruction process becomes slow.

SUMMARY

An emulator system comprising field programmable gate arrays (FPGAs) is configured to test a circuit design. The system segregates the circuit design into a plurality of subnets, which are sets of communicatively coupled logic gates within the circuit design being emulated. It then inserts logic for generating power consumption data, such as logic for generating data in the switching activity interchange format (SAIF) ("SAIF logic"), into each of the plurality of subnets. The SAIF logic comprises counters inserted into the design to count SAIF data T0, T1, TC. T0 is the time a signal is low. T1 is the time the signal is high. TC is the number of times the signal toggles from toggles low to high or high to low. For the plurality of subnets, the system: (i) selects a subnet, the subnet previously being unselected, (ii) executes a test through the selected subnet having the SAIF logic to generate a SAIF file for the subnet, (iii) stores the SAIF file for the selected subnet, (iv) continues with (i) through (iii) until each of the plurality of subnets is selected. The system then merges the SAIF file from each selected subnet into a consolidated SAIF file. The SAIF file corresponds to the collected SAIF data for the circuit design.

In an embodiment, a logic design for calculating SAIF data for a circuit design is disclosed. The logic design includes a plurality of hardware look up tables (LUTs) corresponding to the logic design, a multiplexer (MUX) for sets of inputs to each of the LUTs, and a SAIF counter logic for receiving, from the MUX, a selected one of the sets of inputs. The SAIF counter logic includes a shadow LUT, a counter, and memory. The SAIF counter logic the inputs of the selected LUT, generates a SAIF count for a subnet, stores the count for the selected LUT in the memory, and repeats these steps for each of the LUTs, which are selected in turn by the MUX. The memory merges the SAIF count from each LUT into a consolidated SAIF data file.

Several embodiments disclosed herein re-use SAIF logic across multiple portions of the circuit design, e.g., by re-running or sweeping across different portions of the design, or re-compiling the design one or more times to collect SAIF data for different portions. This balances the speed of SAIF data collection with the capacity of the emulator. While a lower number of recompiles or re-runs improves speed, the mechanisms described herein for re-compiling or re-using SAIF logic components allows for the capture of SAIF data using fewer additional resources than the prior approach that involved extracting all sequential and combinational signals from the design.

BRIEF DESCRIPTION OF THE DRAWINGS

Figure (FIG.) 1 is a diagram of an example direct SAIF implementation, in one embodiment.

FIG. 6 shows a flow diagram of a process for implementing SAIF using a shadow LUT.

FIGS. 9A, 9B and 9C are simplified block diagrams of a computer system suitable for use with embodiments of the technology, as well as circuit design and circuit embodiments of the technology.

DETAILED DESCRIPTION

Figure 1:
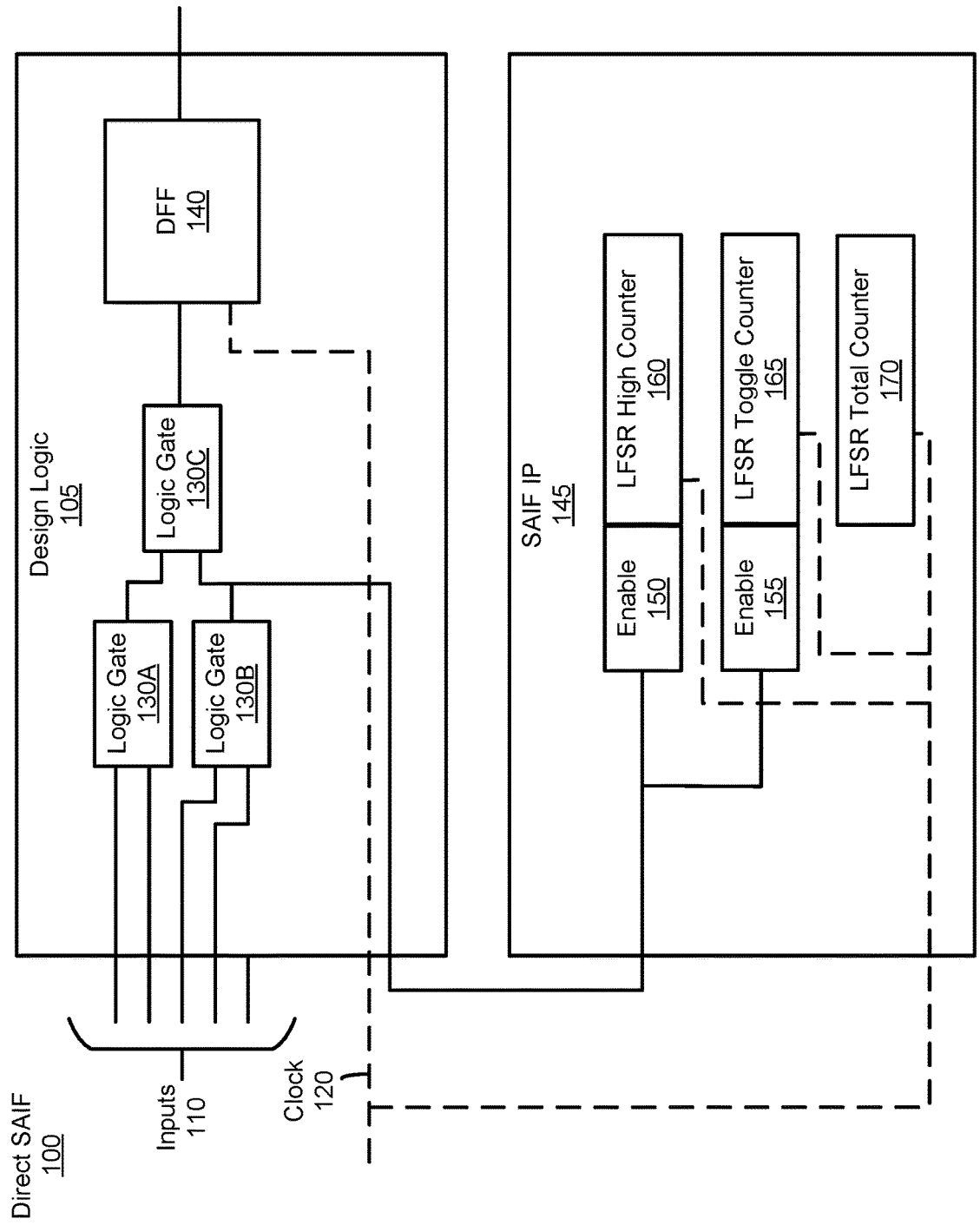

Traditionally, estimating power consumption for a circuit design within an emulator requires extracting all signal waveforms from the emulator. These signal waveforms are then converted into a format that allows power consumption data to be estimated by a power estimation tool. Such a process is time-intensive, and may require up to 8000 CPU hours to complete for a design containing 400 million logic gates.

In order to calculate power dissipation in an emulated circuit design, waveforms of signals received from an emulator are represented in switching interface activity format (SAIF). A waveform of a signal represented in SAIF may describe a number of toggles of the signal, a number of clock cycles during which the signal is in a low state, and a number of signals during which the signal is in a high state. A SAIF data file is traditionally generated outside of the emulator based on waveforms produced during the emulation. The processes disclosed generates the SAIF file within the emulator, increasing computation efficiency.

Configuration Overview

Disclosed is a set of configurations for generating power consumption data (e.g., SAIF data) within an emulator with reference to the accompanying drawings showing preferred embodiments of the invention. The invention may, however, be embodied in different forms and should not be construed as limited to the embodiments set forth herein. Rather, these embodiments are provided so that the disclosure will fully convey the scope of the invention to those skilled in the art.

The following descriptions outline three SAIF file calculation methods that allow the emulator to run faster than prior methods for generating SAIF files for all nets in the design aggregated over the entire test length. The embodiments discussed separate the overall design into sections, or nets, in order to expedite the runtime of the circuit design while a SAIF file is being generated. Typically, the design is divided into between three and ten nets. The nets are further divided into subnets. Each subnet comprises a plurality of logic gates of the design that are communicatively coupled. In FPGA-based emulators, logic subnets are represented using lookup tables, or LUTs. A LUT has input and output terminals, and can be configured to behave as a digital circuit comprised of multiple logic gates. A LUT can be visualized as a black box with several input pins and one output pin containing 1-4 combinational gates and optionally a sequential cell. Typically, three to four gates are mapped to a single LUT. Each LUT typically can be divided into between one and three subnets; in other arrangements, LUTs can be divided into more subnets.

After the overall design is divided into subnets, SAIF data is calculated for each subnet. In a direct SAIF embodiment, the logic within the subnet is rerun each time SAIF data is collected. In shadow LUT and centralized SAIF IP embodiments, a shadow LUT is used to replicate the subnet logic in the SAIF IP. When SAIF is calculated for every subnet, the SAIF files from each subnet are merged into a consolidated SAIF file for the design. The SAIF files from the subnets are non-overlapping and may be merged by many different methods. One method, for example, is by simple concatenation.

Although the embodiments described herein relate to FPGA emulators, the system configurations and methods described are interoperable with any type of emulator. In addition, while the embodiments described herein are described with respect to generating SAIF data, similar techniques can be applied to generate power consumption data in other formats, such as FSDB or VCD.

In one embodiment, a method for calculating switching interface activity format (SAIF) for a circuit design involves segregating the circuit design into a plurality of subnets, and inserting switching activity interface format (SAIF) logic into each of the plurality of subnets. The SAIF logic comprises a set of counters each coupled to a clock signal. At least one counter of the set of counters is coupled to an enable switch. For each of the plurality of subnets, the method involves (1) selecting a previously-unselected subnet, (2) executing a test signal through the selected subnet and having the SAIF logic generate a SAIF file for the subnet, (3) storing the SAIF file for the selected subnet, and (4) continuing with (1) through (3) until each of the plurality of subnets is selected. The method further includes merging the SAIF file from each selected subnet into a consolidated SAIF file corresponding to the calculated SAIF data for the circuit design.

The SAIF file for the selected subnet may include a time the test signal was high, a time the signal was low, and a number of toggles. The plurality of subnets may include between two and eleven subnets. One or more of the counters may be implemented as linear feedback shift registers (LFSRs). A first counter may log the number of times the test signal was high. A second counter may log the total number of output values for the test signal. The SAIF logic may be inserted into one or more free spaces within the circuit design.

In some embodiments, the SAIF logic may further include a logic element, such as an AND gate or an OR gate. The logic element may be coupled to the enable switch. In some embodiments, a shadow lookup table (LUT) is included in the SAIF logic. Input terminals of the shadow LUT may be coupled to input terminals of a logic element in the circuit design, and an output terminal of the shadow LUT may be coupled to the enable switch. The shadow LUT may be a replica of the logic element.

In another embodiment, an emulator system has an emulator with field programmable gate arrays (FPGAs) configured to test a circuit design. The system includes a processor configured to segregate the circuit design into a plurality of subnets, and insert switching activity interface format (SAIF) logic into each of the plurality of subnets. The SAIF logic includes a set of counters each coupled to a clock signal. At least one counter of the set of counters is coupled to an enable switch. The processor configures the FPGAs to (1) select a previously-unselected subnet, (2) execute a test signal through the selected subnet and have the SAIF logic generate a SAIF file for the subnet, (3) store the SAIF file for the selected subnet, and (4) continue with (1) through (3) until each of the plurality of subnets is selected. The processor further configures the FPGAs to merge the SAIF file from each selected subnet into a consolidated SAIF file, the SAIF file corresponding to the calculated SAIF data for the circuit design.

The SAIF file for the selected subnet may include a time the test signal was high, a time the signal was low, and a number of toggles. The plurality of subnets may include between two and eleven subnets. One or more of the counters may be implemented as linear feedback shift registers (LFSRs). A first counter may log the number of times the test signal was high. A second counter may log the total number of output values for the test signal. The SAIF logic may be inserted into one or more free spaces within the circuit design. The SAIF logic may be added incrementally.

In some embodiments, the SAIF logic may further include a logic element, such as an AND gate or an OR gate. The logic element may be coupled to the enable switch. In some embodiments, a shadow lookup table (LUT) is included in the SAIF logic. Input terminals of the shadow LUT may be coupled to input terminals of a logic element in the circuit design, and an output terminal of the shadow LUT may be coupled to the enable switch. The shadow LUT may be a replica of the logic element.

In some embodiments, the test signal is executed multiple times per compile. The test signal may be run in parallel on multiple emulators.

Example SAIF Configurations

Figure (FIG. 1 is a diagram of an example direct SAIF implementation 100 in one embodiment. This example implementation may be run, for example, using an FPGA. The direct SAIF process is a process designed to calculate SAIF data directly in the emulator. Hardware is added into the emulator in order to calculate SAIF using this method. Specifically, SAIF intellectual property (IP) (e.g., preconfigured circuit design(s)) is added into the design of the circuit being emulated. Using this method, SAIF data is calculated for one subnet of the design at a time. Because only one subnet is analyzed at a time, the emulator is able to run at the speed of the emulation were SAIF data not being collected (e.g., at a frequency of 1 MHz or more). By contrast, in prior methods in which waveforms for the entire design are saved, the emulation may only run at slower speeds of, for example, 1 kHz. Because of this, the SAIF data calculation process is faster than prior methods, even though the design is recompiled after each run, or as many times as there are subnets. In some embodiments, the direct SAIF process is run in parallel on multiple emulators to speed up the calculation process. For example, running direct SAIF on as many emulators as there are subnets causes the emulator to run as quickly as if no SAIF IP were installed.

The implementation 100 includes design logic 105 and a SAIF IP 145. The design logic 105 receives signals from one or more inputs 110 and a clock 120. The design logic 105 comprises one or more logic gates 130 connected in series with a D flip flop (DFF) 140. The SAIF IP 145 includes an enable 150 coupled to a linear feedback shift register (LFSR) high counter 160. The SAIF IP 145 also includes an enable 155 coupled to a LFSR toggle counter 165. The enables 150 and 155 may be implemented as gates or latches, such as an AND gate or an OR gate. Linear feedback shift registers are chosen because using them is the standard way to implement counters using an FPGA. In other embodiments, different types of counter implementations are used. Although the design logic 105 and SAIF IP 145 are abstracted in FIG. 1 and subsequent figures as separate modules, the SAIF IP is embedded within the design logic 105 itself.

The inputs 110 are binary low and high electronic signals that are applied to input terminals of logic gates of the design logic 105, e.g., 130A and 130B. The clock input 120 produces an oscillating timed signal that fluctuates between low and high states at a specified frequency for the design represented by design logic 105. The clock 120 may be gated in order to reduce power dissipation. The logic gates 130 together comprise a subnet of the digital design. The logic gates 130 within the subnet may be, for example, AND, OR, or XOR gates. In the example shown in FIG. 1, the result of logic gate 130C is connected to one of the input terminals of the D Flip Flop 140.

The SAIF IP module 145 includes an enable 150 communicatively coupled to an LFSR high counter 160. The SAIF IP module 145 counts values for a selected subnet, e.g., the logic gates 130A-130C. While the SAIF IP module 145 is shown receiving the output to logic gate 130B, the SAIF IP module 145 may also receive outputs from other gates in the subnet, e.g., logic gates 130A and 130C. The enable 150 is used to gate the clock input 120. In this configuration, the LFSR high counter 160 increments by one for each clock cycle that the signal output by logic gate 130B is high. In other words, the LFSR high counter 160 counts all of the high values output by the logic gate 130B. The LFSR toggle counter 165 counts all of the rising or falling edge values output by the logic gate 130B. Additional high counters and toggle counters may be included to count high signals and toggles of other logic gates, e.g., logic gates 130A and 130C. The LFSR total counter 170 counts all values output by the logic gate 130B. There is one LFSR total counter per gated clock (e.g., clock 120 in FIG. 1). The LFSR total counter 170 is shared per clock domain, i.e., for each clock in a circuit design, only one LFSR total counter may be included, and shared across all LFSR high counters and LFSR toggle counters for counting signals based on the clock. The data from both counters 160 and 165 is extracted at the end of each test, or per SAIF file created. For example, the emulator may run software for generating the SAIF file based on the extracted data. The shift register values of each LFSR counter 160, 165, 170, which increment in a predictable sequence, are mapped to count values based on a mapping between the shift register sequences and count values. The output SAIF file contains three parameters extracted from the counters. The TOGGLE value, also referred to as TC, is the value output by the LFSR toggle counter 165. The HIGH value, also referred to as T1, is the value output by the LFSR high counter 160. The LOW value, also referred to as T0, is obtained by subtracting the HIGH value from the TOTAL value.

Figure 2:
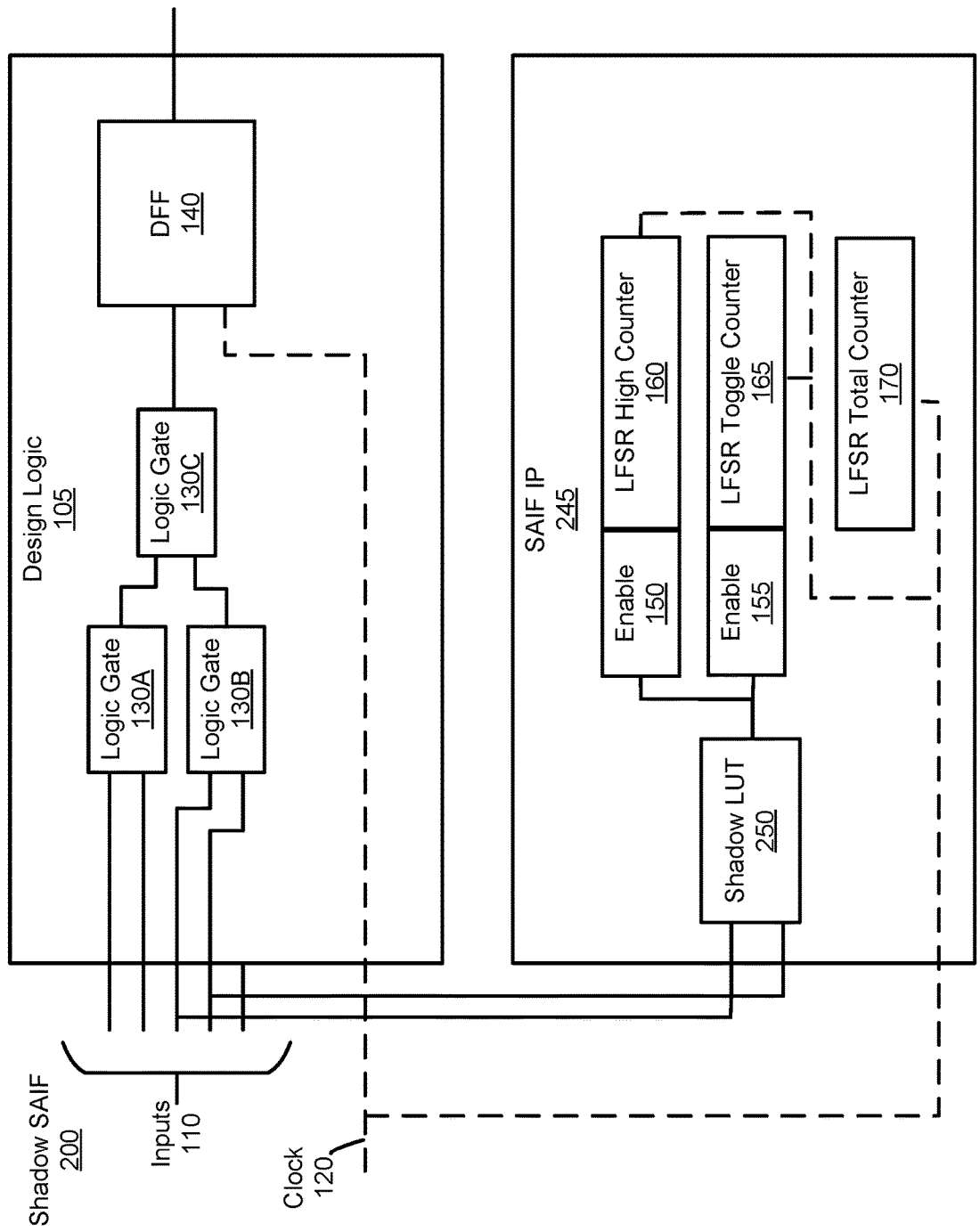
FIG. 2 is a diagram of an example shadow SAIF implementation, in one embodiment.

FIG. 2 is a diagram of an example shadow SAIF implementation 200 in one embodiment. The implementation 200 adds a shadow LUT 250 to the SAIF IP module 245. The design logic 105 shown may be identical to the design logic of FIG. 1, as changing the logic gates does not affect the shadow SAIF process, and adding the shadow SAIF process does not affect the design logic 105.

The shadow LUT 250 replicates the subnet being analyzed for SAIF data calculation within the SAIF IP 245 in this implementation. This adds additional overhead to the design, as an additional LUT must be added per SAIF IP. Adding additional LUTs does not affect computation time significantly. The shadow LUT 250 may be inserted directly into the SAIF IP 245, in order to prevent the need for a full placement and routing. With the shadow LUT 250 in place, the number of recompiles needed to calculate SAIF data for the design is reduced when compared to the number of recompiles needed in the direct SAIF implementation 100. In the direct SAIF implementation 100, the output logic of each subnet is calculated on every recompile before it is sent to the SAIF IP module. By contrast, in the shadow LUT implementation 200, the logic of each subnet is replicated in the SAIF IP module. Whenever a new subnet is to be evaluated, the logic within the shadow LUT module 250 is replaced and the design is re-run, which takes a short amount of time (e.g., 30 minutes or less) relative to recompiling the design, which can take significantly more time, e.g., five to ten hours. Incorporating multiple gates (e.g., gates 130A, 130B, and 130C) into the shadow LUT 250, SAIF data can be collected for each gate over multiple runs without recompiling the design between runs. This occurs for all subnets within the design, allowing SAIF to be computed without recompiling after each subnet. In different embodiments, the LUT chosen for analysis is chosen in multiple ways. In one example embodiment, a LUT is chosen from the design hierarchy at random. In another embodiment, the LUT is chosen from a placed netlist. This is an optimal method of choosing LUTs, as it allows for the insertion of SAIF logic in free spaces around the design.

Figure 3:
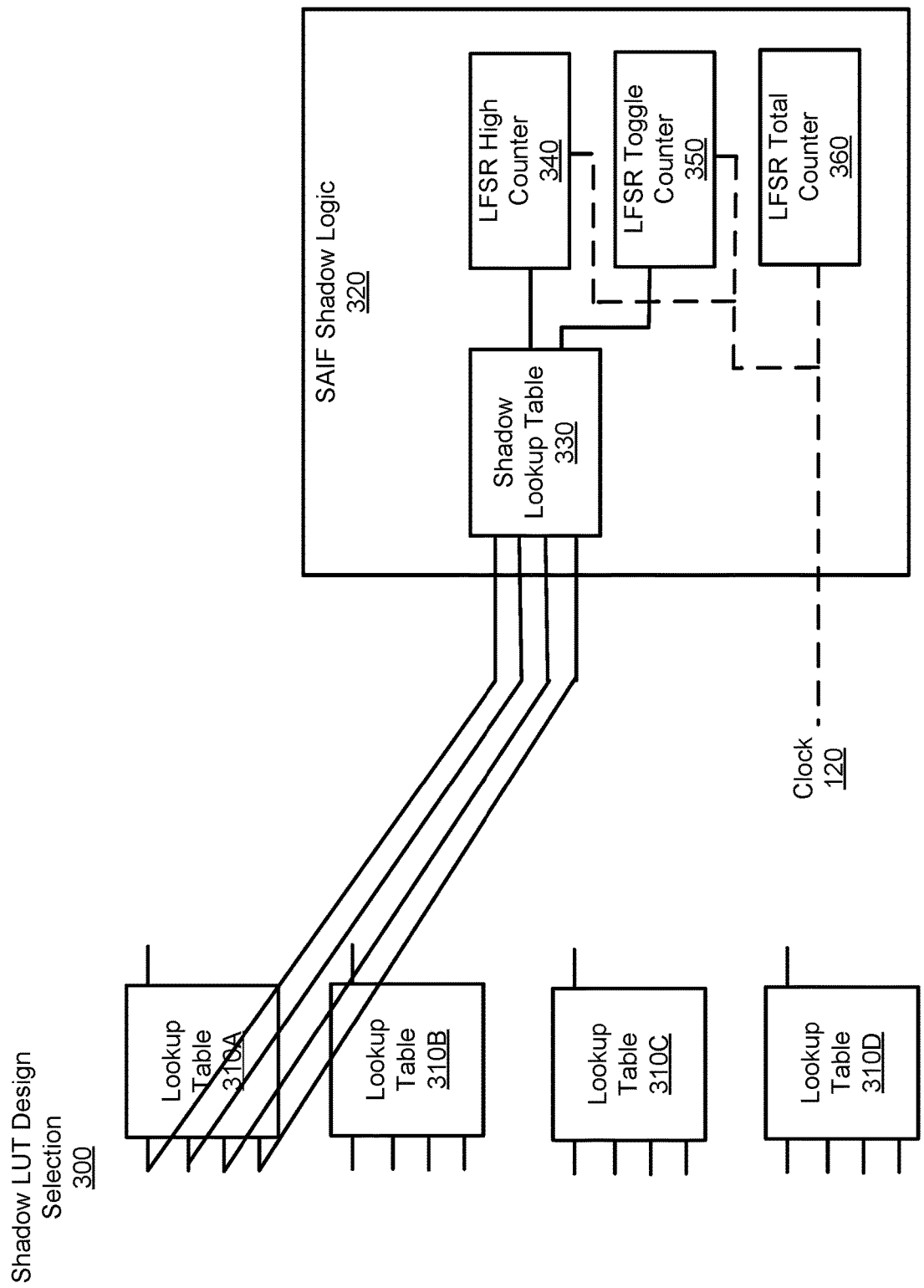
FIG. 3 is a diagram of an example shadow lookup table (LUT) design selection implementation, in one embodiment.

FIG. 3 shows an example embodiment of a design selection method 300 using a shadow LUT. This embodiment has two or more lookup tables (LUTs) 310 (e.g., four LUTs 310A-310D) as well as a SAIF shadow logic module 320. Each lookup table 310 contains a plurality of logic gates. The logic gates are communicatively coupled to one another.

For example, the logic gates may be coupled in the manner in which they are coupled in FIGS. 1 and 2.

The SAIF shadow logic module 320 contains a shadow lookup table 330, an LFSR high counter 340, an LFSR toggle counter 350, and an LFSR total counter 360. The shadow lookup table 330 replicates the logic from the lookup table to which it is communicatively coupled. More particularly, the shadow lookup table 330 has a portion of lookup table 310A for a given run. Over multiple runs, different portions of the lookup table 310A can be loaded into the shadow lookup table 330, e.g., for different gates in the lookup table 310A, without recompiling the design.

In the embodiment of FIG. 3, lookup table 310A is communicatively coupled to the shadow lookup table 330. The shadow lookup table 330 replicates the logic from lookup table 310A within the SAIF shadow logic module 320. The LFSR high counter 340 counts all of the high values output by the shadow lookup table 330, the LFSR toggle counter 350 counts all toggles in the value output by the shadow lookup table 330, and the LFSR total counter 350 counts all values output by the shadow lookup table 330. The design is re-compiled when the SAIF shadow logic 320 is communicatively coupled to a new lookup table, e.g., lookup table 310B.

Figure 4:
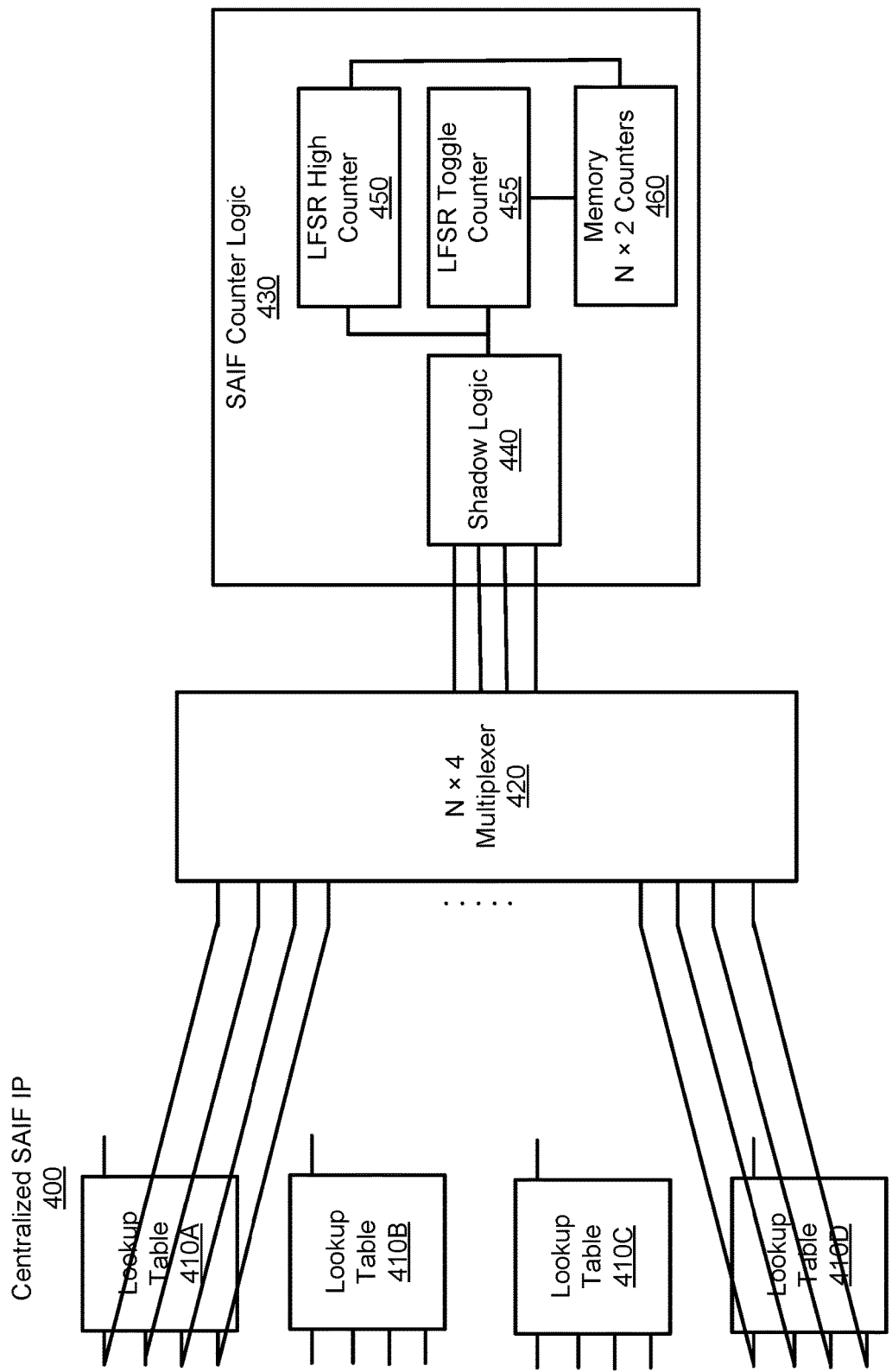
FIG. 4 shows an embodiment of an example centralized SAIF IP environment where a multiplexer (MUX) is used to select lookup tables for the purpose of calculating SAIF.

FIG. 4 shows an example embodiment of a centralized SAIF IP environment 400 where a multiplexer (MUX) is used to select lookup tables for the purpose of calculating SAIF data. The environment includes one or more LUTs 410 (e.g., four LUTs 410A-410D), a multiplexer 420, and SAIF counter logic 430. This configuration allows all of the LUTs 410 in the design to be swept over in one run, reducing the amount of recompiles needed to calculate the SAIF data for the circuit design. This lowers the runtime speed of the circuit, i.e., the runtime is slowed down because, for each clock cycle, the SAIF counter logic 430 sweeps over each LUT 410. The speed is inversely proportional to the amount of LUTs in the design.

The LUTs 410 comprise nets of the circuit design. The LUTs 410 may comprise, for example, the design logic 105 of FIGS. 1 and 2. The MUX 420 is configured to switch between LUTs 410A-410D. The MUX 420 is communicatively coupled to each of the LUTs 410 and to the SAIF counter logic 430. The MUX 420 is added in the design in front of the of the SAIF counter logic 430. The multiplexer 420 has at least as many sets of inputs as there are lookup tables. The number of inputs per set is greater than or equal to the number of inputs of each LUT 410. For example, if an individual LUT has four inputs, each set of inputs in the MUX 420 has at least four inputs. The multiplexer 420 allows SAIF data to be calculated for each of the lookup tables 410 in the design at once in a single compile. It does this by iterating over each LUT for every clock value (i.e., during a single clock cycle, the MUX 420 iterates through inputs from each LUT 410).

The SAIF counter logic 430 receives test input signals to each LUT 410 via the MUX 420. The SAIF counter logic 430 comprises shadow logic 440, an LFSR high counter 450, an LFSR toggle counter 455, and a memory 460. The shadow logic 440, similarly to the shadow LUT 250, replicates the logic of the LUT 410 selected by the MUX 420. The LFSR high counter 450 is communicatively coupled to the shadow logic 440 and counts the HIGH output values of the shadow logic 440. The LFSR toggle counter 455 is communicatively coupled to the shadow logic 440 and counts all toggles in the value by the shadow logic 440.

The memory 460 is a common memory for storing the results from LFSR high counter 450 and LFSR toggle counter 455 from each LUT 410. The memory 460 may be, for example, a block random-access memory (BRAM). The memory 460 comprises twice as many counters as there are LUTs in the design, i.e., two counters (a high counter and a toggle counter) for each LUT 410. In some embodiments, the memory 460 may comprise an additional counter for each LUT 410 (e.g., a low counter, or a total counter), or one additional total counter for storing the number of clock cycles. Storing counters in the memory 460 allows the design to use less logic overall and reduces the number of compiles needed to calculate SAIF.

Figure 5:
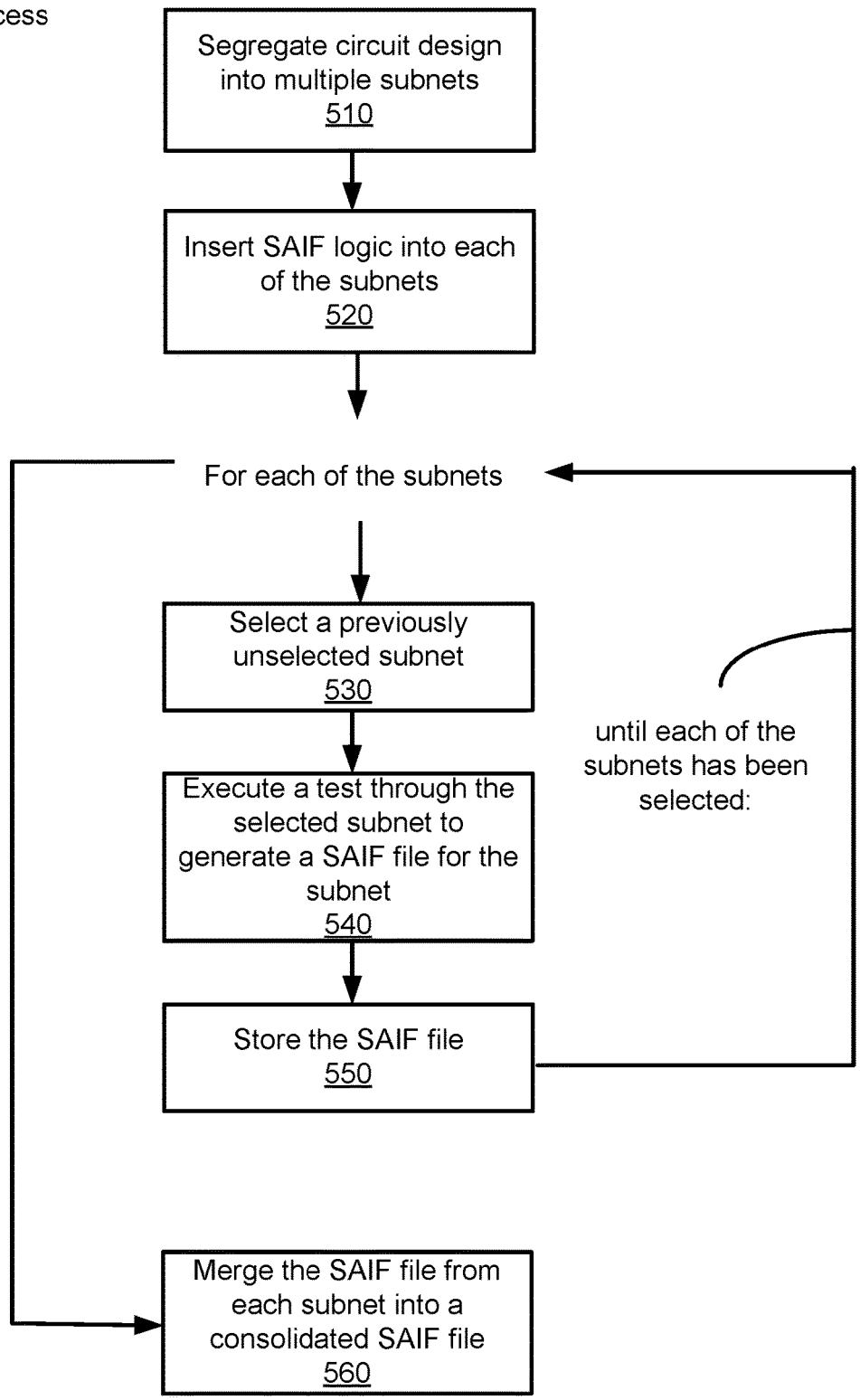
FIG. 5 shows a flow diagram of a process for implementing direct SAIF.

FIG. 5 shows a flow diagram 500 of an example process for implementing direct SAIF. First, the circuit design is segregated 510 into multiple subnets. The number of subnets into which the circuit design is segregated may be based on the size of the circuit design, and how much extra emulation capacity can be added to the circuit design. SAIF logic is then inserted 520 into each of the subnets. In order to speed up compilation, SAIF IP can be inserted in a uniform manner across all FPGAs implementing the design. The design can be compiled even when not all of the SAIF IP are not connected. Therefore, SAIF IP units can be added incrementally, and recompiles can be executed as the SAIF IP are placed in the netlist. Performing recompiles in this manner may be faster than performing a full placement and routing of the design, and then recompiling the full design as many times as there are nets in the design.

For each subnet, a series of steps occurs. A previously unselected subnet is selected 530. The subnet may be chosen either randomly, from the design hierarchy, or from a placed netlist. A test is then executed 540 through the subnet to generate a SAIF file for the selected subnet. The SAIF file is then stored 550. When SAIF files for all subnets have been stored, each SAIF file is merged 560 (e.g., using concatenation) to create a consolidated SAIF file.

FIG. 6 shows a flow diagram 600 of an example process for implementing SAIF using a shadow LUT. The shadow LUT may be, for example, the shadow LUT 250 of FIG. 2. The circuit is segregated 610 into multiple LUTs. For each LUT, a series of steps may be taken. A LUT is selected 620 from the set of LUTs. Logic from the LUT is copied 630 into a shadow LUT. A test is executed 640 on the shadow LUT to generate a SAIF file. The SAIF file is stored 650 in memory. The system is recompiled. When all SAIF files have been selected, they are merged 660 into a consolidated SAIF file.

Figure 7:
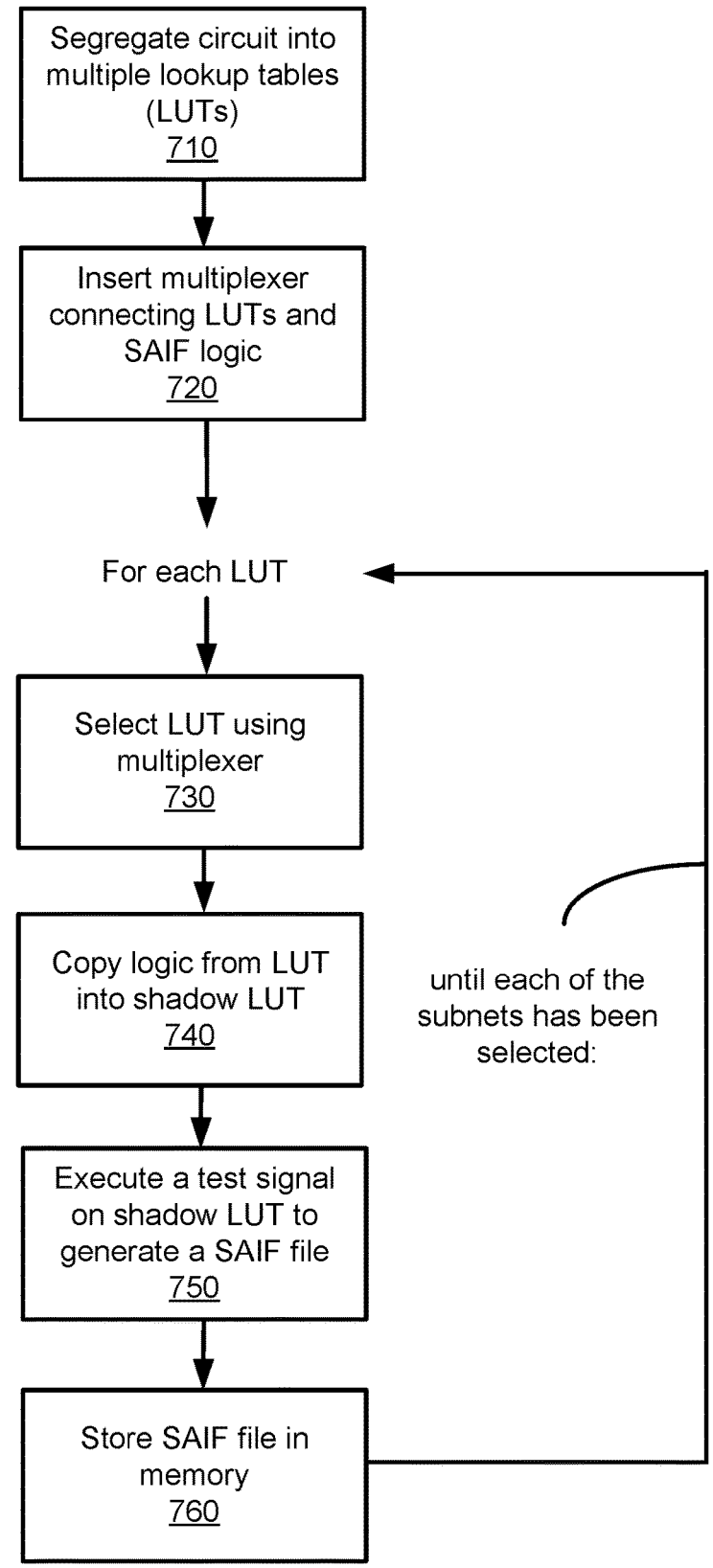
FIG. 7 shows a process for calculating centralized SAIF using a multiplexer (MUX).

FIG. 7 shows an example process 700 for calculating centralized SAIF using a multiplexer (MUX). The MUX used may be, for example, the MUX 420 of FIG. 4. The circuit is segregated 710 into multiple lookup tables (LUTs). The MUX is inserted 720 connecting the lookup tables to the SAIF logic module. For each lookup table, a series of steps is taken. A LUT is selected 730 by the MUX from the set of LUTs. Logic from the LUT is copied 740 into shadow logic, e.g., a shadow LUT. A test is executed 750 on the shadow LUT to generate a SAIF file. The SAIF file is stored 760 in a shared memory.

Example Emulation Environment

Figure 8A:
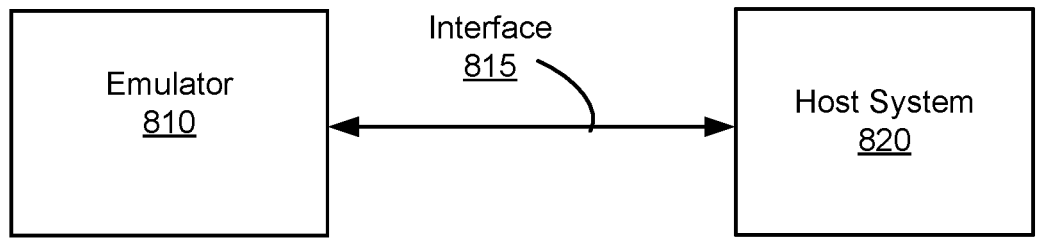
FIG. 8A is a block diagram of an emulation environment, according to one embodiment.

FIG. 8A is a block diagram illustrating an emulation environment 800, according to one embodiment. Any of the SAIF IP shown in FIGS. 1 through 4 or the SAIF methods described with respect to FIGS. 5 through 7 may be incorporated into the emulation environment 800. The emulation environment 800 includes an emulator 810 and a host system 820. The emulator 810 and the host system 820 communicate through an interface 815.

The interface 815 is a communication medium that allows communication between the host system 820 and the emulator 810. In one embodiment, the interface 815 is a cable with electrical connections. For example, the interface 815 may be an USB, ETHERNET, optical, or a custom built cable. In other embodiment, the interface 815 is a wireless communication medium or a network. For another example, the interface 815 may be a wireless communication medium employing a Bluetooth® or IEEE 802.11 protocol.

The emulator 810 is a hardware system that emulates DUTs. The emulator 810 includes FPGAs (may also be referred to as "emulation components") that can be configured to collectively emulate a DUT. In other embodiments, the emulator 810 includes other types of reconfigurable hardware components instead of FPGAs. For a DUT that is to be emulated, the emulator 810 receives from the host system 820 a bit stream (e.g., one or more binary files) including a description of a DUT (e.g., a gate level or HDL description of the DUT) and a description of debugging logic. Additionally, the bit stream describes partitions of the DUT created by the host system 820, mappings of the partitions to emulator FPGAs, placement of logic (DUT logic and debugging logic) on FPGAs, and routings between placed logic. Based on the bit stream, the emulator 810 configures the appropriate FPGAs and emulates the DUT.

The host system 820 configures the emulator 810 for emulating a design under test (DUT) with debugging logic. A DUT is one or more circuit designs that are to be emulated by the emulator 810. The host system 820 may be a single computer or a collection of multiple computers. In the embodiment where the host system 820 is comprised of multiple computers, the functions described herein as being performed by the host system 820 may be distributed among the multiple computers.

The host system 820 receives from a user a description of a DUT to be implemented on the emulator 810. In one embodiment, the description of the DUT is in a type of hardware description language (HDL), such as register transfer language (RTL). The host system 820 creates a gate level netlist based on the HDL description of the DUT. In another embodiment, the description of the DUT received from the user is in a gate level netlist. The host system 820 uses the netlist to determine placement and routing of DUT logic components on the FPGAs of the emulator 810.

The host system 820 also receives from a description of debugging logic to be implemented on the emulator 810 with the DUT. In one embodiment, the host system 820 receives from a user a list of signals to be observed or a type of debugging logic to be implemented, and the host system 820 creates debugging logic according to the user input. In one embodiment, the host system 820 receives from a user a description of the debugging logic in a gate level netlist or in a type of HDL (e.g., RTL) from which a gate level netlist is created. The host system 820 may receive the description of the debugging logic together with the DUT. In one embodiment, the host system 820 adds the debugging logic at predetermined locations regardless of the DUT. For example, the host system 820 may receive a description of the SAIF IP to implement on the emulator, and the host system 820 may add the SAIF IP to the netlist or HDL. The host system 820 determines the placement and routing of the debugging logic on the emulator FPGAs in a manner that the routings between DUT logic components and the debugging logic can be optimized.

The host system 820 generates one or more bit streams which includes information to configure the emulator FPGAs to emulate the DUT with the debugging logic. A bit stream may include, for example, a design description of one or more partitions of the DUT (e.g., gate level or HDL description), mapping information (e.g., mappings of partitions to FPGAs), placement and routing information, and design constraints for the DUT.

Through interface 815, the host system 820 transmits to the emulator 810 the created bit streams to configure the FPGAs to emulate the DUT. During and/or after the emulator 810 emulates the DUT, the host system 820 receives emulation results from the emulator 810. Emulation results are information generated by the emulator 3010 based on the emulation of the DUT. For example, the emulator 3010 may generate SAIF data files and transmit the SAIF data files to the host system 820, as described with respect to FIGS. 1 through 7.

Figure 8B:
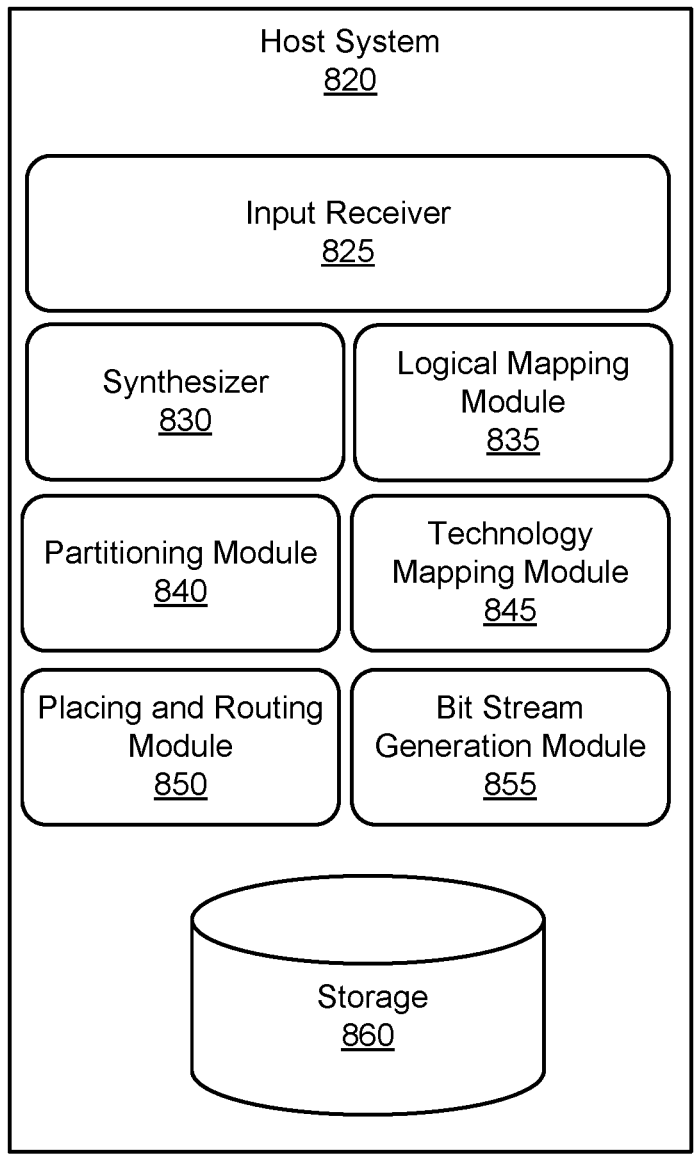
FIG. 8B is a block diagram illustrating a host system, according to one embodiment.

FIG. 8B is a block diagram illustrating the host system 820 in more detail, according to one embodiment. The host system 820 includes an input receiver 825, synthesizer 830, logical mapping module 835, partitioning module 840, technology mapping module 845, placing and routing module 850, bit stream generation module 855, and storage 860. Each of these components may be embodied as hardware, software, firmware, or a combination thereof. Together these components generate information to configure the emulator 810 to emulate a DUT.

The input receiver 825 receives descriptions of a DUT and debugging logic to be implemented by the emulator 810. In one embodiment, the input receiver 825 receives the descriptions of the DUT and the debugging logic in HDL description or in a gate level netlist. The description of the DUT and the description of the debugging logic may be received in a same format or in different formats. Additionally, the input receiver 825 enables a user to provide information indicating which outputs of DUT logic components (i.e., signals) to trace during emulation using the debugging logic.

The synthesizer 830 converts HDL descriptions into gate level logic. If a description of the DUT and/or debugging logic is received in HDL, the synthesizer 830 synthesizes the HDL description to create a gate level netlist with a description of the DUT and/or debugging logic in terms of gate level logic. In one embodiment, the synthesizer 830 may also convert a received gate level netlist (e.g., for the DUT or the debugging logic) into another gate level netlist.

The logical mapping module 835 maps logic of the DUT and the debugging logic to components available in the FPGAs of the emulator 810. For the DUT and the debugging logic, the logical mapping module 835 identifies logic included in the gate level netlist that is not available in the emulator FPGAs and associates (assigns) a corresponding hardware component that is available in an emulator FPGA. For example, the logical mapping module 835 identifies a Boolean logic gate in the gate level netlist and associates the Boolean logic gate with a corresponding logic gate or a look up table (LUT) unit available in an FPGA. In one embodiment, the logical mapping module 835 modifies the gate level netlist based on the mapping.

The partitioning module 840 partitions the DUT and maps the partitions to emulator FPGAs. The partitioning module 840 partitions the DUT at the gate level into a number of partitions using the DUT's netlist. The partitioning module 840 maps each partition to one or more FPGAs of the emulator 810. The partitioning module 840 performs the partitioning and mapping using design rules, design constraints (e.g., timing or logic constraints), and information about the emulator 810.

The technology mapping module 845 maps physical components of the DUT based on the logical mapping and partitioning. Specifically, if necessary, the technology mapping module 845 modifies one or more partitions based on the partitions created and the mappings of the partitions to the FPGAs. For example, assume the DUT includes three logic gates where an output of a first logic gate is connected to an input of a second logic gate and an input of a third logic gate. The DUT may be partitioned such that the first logic gate and the second logic gate are to be implemented on the same FPGA, but the third logic gate is to be implemented on a different FPGA. A connection between the first logic gate and the third logic gate in different FPGAs may have an additional delay compared to a connection between two logic gates in the same FPGA, thereby causing incorrect operations. The technology mapping module 845 may add delay elements (or buffers) between the two logic gates on the same FPGA to match the delay between the logic gates on different FPGAs.

The placing and routing module 850 receives the gate level netlist and information about the partitioning and mapping, and determines placement and connections of each DUT logic component and debugging logic. The placing and routing module 850 places the logic components and the debugging logic in a manner that routings between the logic components and the debugging logic are optimized.

The host system 820 may be a computing system. Additional examples of computing systems that may be configured as the host system 820 are described below and with FIGS. 9A-C.

Hardware/Software Equivalence

At the onset, it is noted that certain innovations, embodiments and/or examples described herein may comprise and/or use one or more processors in a computing system. As used herein, the term "processor" signifies a tangible information processing device that physically transforms information, for example, data. As defined herein, "data" signifies information that can be in the form of an electrical, magnetic, or optical signal that is capable of being stored, accessed, transferred, combined, compared, or otherwise manipulated by an information processing device.

The processor may be electronic, for example, comprising digital logic circuitry (for example, binary logic), or analog (for example, an operational amplifier). The processor also may be non-electronic, for example, as seen in processors based on optical signal processing, DNA transformations or quantum mechanics, or a combination of technologies, such as an optoelectronic processor. For information structured in binary form, any processor that can transform the information using the AND, OR and NOT logical operations (and their derivatives, such as the NAND, NOR, and XOR operations) can transform the information using any function of Boolean logic. A processor such as a neural network processor can also transform information non-digitally. There is no scientific evidence that any of these processors are processing, storing and retrieving information, in any manner or form equivalent to the bioelectric circuitry of the human brain.

As used herein, the term "module" signifies a tangible information processing device that typically is limited in size and/or complexity. For example, one or more methods or procedures in a computer program can be referred to as a module. A module can also refer to a small network of digital logic devices, in which the logic devices often may be interconnected to form a network. In many cases, methods and procedures in a computer program written in a specialized language, such as System C, can be used to generate a network of digital logic devices that process information with exactly the same results as are obtained from the methods and procedures.

A module can be permanently configured (e.g., hardwired to form hardware), temporarily configured (e.g., programmed with software), or a combination of the two configurations (for example, a structured ASIC). Permanently configured modules can be manufactured, for example, using Application Specific Integrated Circuits (ASICs) such as Arithmetic Logic Units (ALUs), Programmable Logic Arrays (PLAs), or Read Only Memories (ROMs), all of which are typically configured during manufacturing. Temporarily configured modules can be manufactured, for example, using Field Programmable Gate Arrays (FPGAs—for example, sold by XLINX or ALTERA), Random Access Memories (RAMs) or microprocessors. A module is configured to process information, typically using a sequence of operations to transform the information (or in the case of ROMs and RAMS, transforming information by using the input information as an address for memory that stores output information), to perform aspects of the present innovations, embodiments and/or examples of the invention.

Modules that are temporarily configured need not be configured at any one instance in time. For example, an information processor comprising one or more modules can have the modules configured at different times. The processor can comprise a set of one or more modules at one instance of time, and to comprise a different set of one or modules at a different instance of time. The decision to manufacture or implement a module in a permanently configured form, a temporarily configured form, or a combination of the two forms, may be driven by cost, time considerations, engineering constraints and/or specific design goals. The "substance" of a module's processing is independent of the form in which it is manufactured or implemented.

As used herein, the term "algorithm" signifies a sequence or set of operations or instructions that a module can use to transform information to achieve a result. A module can comprise one or more algorithms.

As used herein, the term "computer" includes an information processor that can perform certain operations such as (but not limited to) the AND, OR and NOT logical operations, with the addition of memory (for example, memory based on flip-flops using the NOT-AND or NOT-OR operation). Such a digital computer is said to be Turing-complete or computationally universal. A computer, whether or not it is a digital computer, typically comprises many modules. The computer may be configured to include a processor and a memory. It also may include a file storage subsystem that is a long term information storage medium. The information storage medium may be a non-transitory computer readable storage medium, e.g., a flash memory, a magnetic disk or optical disk.

As used herein, the term "software" (or "program", "code", or "program code") signifies one or more algorithms and data structures (which may be made up of instructions or instruction sets) that configure an information processing device (e.g., via a processor and/or controller) for use in the innovations, embodiments and examples described in this specification. Such devices configurable by software include one or more computers, for example, standalone, client or server computers, or one or more hardware modules, or systems of one or more such computers or modules. As used herein, the term "software application" signifies a set of instruction and data that configure the information processing device to achieve a specific result, for example, to perform word processing operations, or to encrypt a set of data. The software may be stored in a non-transitory computer readable storage medium.

As used herein, the term "programming language" signifies a grammar and syntax for specifying sets of instruction and data that comprise software. Programming languages include assembler instructions, instruction-set-architecture (ISA) instructions, machine instructions, machine dependent instructions, microcode, firmware instructions, state-setting data, or either source code or object code written in any combination of one or more higher level languages, such as conventional procedural programming languages, for example, the "C" programming language or similar programming languages (such as SystemC), or object oriented programming language such as Smalltalk, C++ or the like, and any future equivalent programming languages.

Software is entered into, equivalently, read into, one or memories of the computer or computer system from the non-transitory computer readable storage medium. The computer typically has a device for reading storage media that is used to transport the software, or has an interface device that receives the software over a network.

Example of Specific Computing System

Turning now to a specific example of a computing system, FIGS. 9A, 9B and 9C are simplified block diagrams of a computer system suitable for use with embodiments of the technology, as well as circuit design and circuit embodiments of the technology. For example, the figures illustrate components that may be used for a host system 820 and/or may make up part of an emulator 810.

Computer system 910 typically includes at least one processor 914 which communicates with a number of peripheral devices via bus subsystem 912. These peripheral devices may include a storage subsystem 924, comprising a memory subsystem 926 and a file storage subsystem 928, user interface input devices 922, user interface output devices 920, and a network interface subsystem 916. The input and output devices allow user interaction with computer system 910.

The computer system may be a server computer, a client computer, a workstation, a mainframe, a personal computer (PC), a tablet PC, a set-top box (STB), a personal digital assistant (PDA), a cellular telephone, a smartphone, a web appliance, a television, a network router, switch or bridge, or any data processing machine capable of executing instructions 124 (sequential or otherwise) that specify actions to be taken by that machine. Innovations, embodiments and/or examples of the claimed inventions are neither limited to conventional computer applications nor the programmable apparatus that run them. To illustrate, the innovations, embodiments and/or examples of the claimed inventions can include an optical computer, quantum computer, analog computer, or the like. Aspects of the present invention are well suited to multi-processor or multi-core systems and may use or be implemented in distributed or remote systems. Processor here is used in the broadest sense to include singular processors and multi-core or multi-processor arrays, including graphic processing units, digital signal processors, digital processors and combinations of these elements. Further, while only a single computer system or a single machine may be illustrated, the use of a singular form of such terms shall also signify any collection of computer systems or machines that individually or jointly execute instructions to perform any one or more of the sets of instructions discussed herein. Due to the ever-changing nature of computers and networks, the description of computer system 910 depicted in FIG. 9A is intended only as a specific example for purposes of illustrating the preferred embodiments. Many other configurations of computer system 910 are possible having more or less components than the computer system depicted in FIG. 9A.

Network interface subsystem 916 provides an interface to outside networks, including an interface to communication network 918, and is coupled via communication network 918 to corresponding interface devices in other computer systems or machines. Communication network 918 may comprise many interconnected computer systems, machines and communication links. These communication links may be wireline links, optical links, wireless links, or any other devices for communication of information. Communication network 918 can be any suitable computer network, for example the Internet.

User interface input devices 922 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 910 or onto communication network 918.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output devices. In general, use of the term "output device" is intended to include all possible types of devices and ways to output information from computer system 910 to the user or to another machine or computer system.

Memory subsystem 926 typically includes a number of memories including a main random access memory (RAM) 930 for storage of instructions and data during program execution and a read only memory (ROM) 932 in which fixed instructions are stored. File storage subsystem 928 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 928.

Bus subsystem 912 provides a device for letting the various components and subsystems of computer system 910 communicate with each other as intended. Although bus subsystem 912 is shown schematically as a single bus, alternative embodiments of the bus subsystem may use multiple busses.

FIG. 9B shows a memory 940 such as a non-transitory, computer readable data storage medium associated with file storage subsystem 928, and/or with network interface subsystem 916. The memory 940 may include a data structure specifying a circuit design. The memory 940 can be a hard disk, a floppy disk, a CD-ROM, an optical medium, flash memory, removable media cartridge, or other medium that stores computer readable data non-volatile form. Moreover, this medium may interface with a volatile memory such as dynamic random access memory (DRAM) or static random access memory (SRAM). The memory 940 may store software. By way of example, the software may correspond to software corresponding to a logical representation of a circuit design 980. This logical representation of the circuit design 980 may be stored as one or more cells in a cell library. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 9C is a block representing an integrated circuit 990. The integrated circuit 990 may be physically instantiated version of the logical representation of the circuit device 980. It may be created with the described technology that includes one or more cells selected from the cell library.

In the context of emulation, by way of example, the circuit emulated through the emulator 810 may have design characteristics of the logical representation of the circuit design 980 stored in then memory 940. This logical representation of the circuit design 980 may be used to configure the emulator 810 to provide the functionality of an integrated circuit 980.

Additional Considerations

The implementations disclosed herein collect power consumption data directly on the emulator. This eliminates the need to capture waveforms used for power analysis on the emulator and transfer the waveforms off of the emulator, which leads a slow runtime and a slow data transfer. By contrast, collecting power consumption on the emulator is faster than saving waveforms on the emulator, and the power consumption data (e.g., the SAIF files) are much faster to export from the emulator than captured waveforms.

Incorporating SAIF IP for a portion of the nets in the design, and repeating the SAIF calculation across the each portions sequentially (e.g., by sweeping across the portions, as described with respect to FIG. 4; by re-running over different portions of the design, as described with respect to FIGS. 2 and 3; or by re-compiling the design, as described with respect to FIGS. 1-3) balances the speed of SAIF data collection with the capacity of the emulator. While a lower number of recompiles or re-runs improves speed, the mechanisms described herein for re-compiling or re-using SAIF IP components allows for the capture of SAIF data using available resources of emulator systems.

The foregoing detailed description signifies in isolation individual features, structures or characteristics described herein and any combination of two or more such features, structures or characteristics, to the extent that such features, structures or characteristics or combinations thereof are based on the present specification as a whole in light of the knowledge of a person skilled in the art, irrespective of whether such features, structures or characteristics, or combinations thereof, solve any problems disclosed herein, and without limitation to the scope of the claims. When an embodiment of a claimed invention comprises a particular feature, structure, or characteristic, it is within the knowledge of a person skilled in the art to use such feature, structure, or characteristic in connection with other embodiments whether or not explicitly described.

In view of the foregoing detailed description it will be evident to a person skilled in the art that many variations may be made within the scope of innovations, embodiments and/or examples, such as function and arrangement of elements, described herein without departing from the principles described herein. One or more elements of an embodiment may be substituted for one or more elements in another embodiment, as will be apparent to those skilled in the art. The embodiments described herein were chosen and described to signify the principles of the invention and its useful application, thereby enabling others skilled in the art to understand how various embodiments and variations are suited to the particular uses signified.

The foregoing detailed description of innovations, embodiments, and/or examples of the claimed inventions has been provided for the purposes of illustration and description. It is not intended to be exhaustive nor to limit the claimed inventions to the precise forms described, but is to be accorded the widest scope consistent with the principles and features disclosed herein. Obviously, many variations will be recognized by a person skilled in this art. Without limitation, any and all equivalents described, signified or incorporated by reference in this patent application are specifically incorporated by reference into the description herein of the innovations, embodiments and/or examples. In addition, any and all variations described, signified or incorporated by reference herein with respect to any one embodiment are also to be considered taught with respect to all other embodiments. Any such variations include both currently known variations as well as future variations, for example any element used herein includes a future equivalent element that provides the same function, regardless of the structure of the future equivalent.

It is intended that the scope of the claimed inventions be defined and judged by the following claims and equivalents. The following claims are hereby incorporated into the detailed description, with each claim standing on its own as a separate embodiment. The disclosed embodiments can be described with more features than are expressly recited in the claims.

What is claimed is:

1. A method for calculating switching interface activity format (SAIF) for a circuit design, the method comprising:
   segregating the circuit design into a plurality of hardware look up tables (LUTs);
   inserting switching interface activity format (SAIF) counter logic comprising shadow logic, at least one counter, and memory;
   inserting a multiplexer between the plurality of LUTs and the SAIF counter logic;
   for the plurality of LUTs:
   (i) selecting a LUT, the LUT previously being unselected, by switching the multiplexer to correspond to the selected LUT;
   (ii) executing a test through the selected LUT and the SAIF counter logic to generate SAIF data for the LUT,
   (iii) storing the SAIF data for the selected LUT in the memory, and
   (iv) continuing with (i) through (iii) until each of the plurality of LUTs is selected; and
   merging the SAIF data from each selected LUT into a consolidated SAIF file, the consolidated SAIF file corresponding to the SAIF data for the circuit design.

2. The method of claim 1, wherein a predetermined number of the LUTs is between two and eleven.

3. The method of claim 1, wherein the at least one counter is a linear feedback shift register (LFSR).

4. The method of claim 1, wherein the multiplexer selects each of the plurality of LUTs during a single design clock cycle.

5. The method of claim 1, wherein the SAIF data of each LUT is stored in a common memory.

6. The method of claim 1, wherein the shadow logic is configured to replicate logic in each of the plurality of LUTs.

7. The method of claim 1, wherein the multiplexer connects to inputs of each of the plurality of LUTs.

8. The method of claim 1, wherein the at least one counter comprises at least one high counter for counting a high signal output by the selected LUT and at least one toggle counter for counting a toggle output by the selected LUT.

9. A logic design for calculating switching interface activity format (SAIF) for a circuit design, the logic design comprising:

a plurality of hardware look up tables (LUTs) corresponding to the logic design;

a switching interface activity format (SAIF) counter logic comprising shadow logic, at least one counter, and memory; and a multiplexer between the plurality of LUTs and the SAIF counter logic, the multiplexer configured to select a LUT of the plurality of LUTs, the selected LUT previously being unselected, the SAIF counter logic configured to receive a test input signal for the selected LUT and to (i) generate SAIF data for a subnet, (ii) transmit the SAIF data for the selected LUT for storage in the memory, and (iii) continue with (i) through (ii) until each of the plurality of LUTs is selected by the multiplexer, and the memory merging the SAIF data from each selected LUT into a consolidated SAIF file, the consolidated SAIF file corresponding to SAIF data for the circuit design.

10. The logic design of claim 9, wherein a predetermined number of the LUTs is between two and eleven.

11. The logic design of claim 9, wherein the memory counter is a linear feedback shift register (LFSR).

12. The logic design of claim 9, wherein the multiplexer is configured to select each of the plurality of LUTs during a single design clock cycle.

13. The logic design of claim 9, wherein the SAIF data of each LUT is stored in a common memory.

14. The logic design of claim 9, wherein the shadow logic is configured to replicate logic in each of the plurality of LUTs.

15. The logic design of claim 9, wherein the multiplexer connects to inputs of each of the plurality of LUTs.

16. The logic design of claim 9, wherein the at least one counter comprises at least one high counter for counting a high signal output by the selected LUT and at least one toggle counter for counting a toggle output by the selected LUT.

* * * * *